(12) United States Patent
Winkler

(10) Patent No.: US 6,446,935 B1
(45) Date of Patent: Sep. 10, 2002

(54) VALVE DEVICE WITH ELEVATED MOUNTING PADS

(75) Inventor: Alexander Winkler, Skokie, IL (US)

(73) Assignee: Sharon Piping & Equipment, Inc., Northlake, IL (US)

( * ) Notice: Subject to any disclaimer, the term of this patent is extended or adjusted under 35 U.S.C. 154(b) by 0 days.

(21) Appl. No.: 09/661,476

(22) Filed: Sep. 14, 2000

(51) Int. Cl.[7] ................................................ F16K 5/06
(52) U.S. Cl. .................... 251/315.1; 251/290; 251/292; 251/128
(58) Field of Search .............................. 251/128, 290, 251/292, 315.1; 137/315.18, 315.2

(56) References Cited

U.S. PATENT DOCUMENTS

| | | | | |
|---|---|---|---|---|
| 2,094,066 A | * | 9/1937 | Gannestad | |
| 4,270,849 A | * | 6/1981 | Kalbfleisch | 251/292 |
| 4,562,993 A | * | 1/1986 | Lew | 251/161 |
| 4,887,634 A | * | 12/1989 | Killian | 137/315 |
| 5,275,200 A | * | 1/1994 | Yamamoto | 137/377 |
| 5,564,461 A | * | 10/1996 | Raymond, Jr. et al. | 137/315 |
| 5,634,486 A | * | 6/1997 | Hatting et al. | 137/315 |
| 5,954,088 A | * | 9/1999 | Huang | 137/315 |
| 6,170,965 B1 | * | 1/2001 | Kotovsky | 362/371 |

* cited by examiner

Primary Examiner—Henry C. Yuen
Assistant Examiner—David A Bonderer
(74) Attorney, Agent, or Firm—Brinks Hofer Gilson & Lione

(57) ABSTRACT

A valve includes a chamber having an inlet, an outlet, and an annular recess. A movable element is disposed in the chamber to control the flow of fluids between the inlet and the outlet. A stem is secured to a movable element and extends exteriorly through the annular recess. A seal and a fastener are disposed around the stem. The fastener is in displaceable engagement and disengagement with the stem and has recesses formed in each of its exterior side surfaces. A plurality of mounting pads are positioned around the annular recess. The mounting pads are elevated to provide separation between the fastener recesses and a peripheral surface. A method of constructing the mechanical valve includes tightening the fastener around the stem by engaging a recess with an axial tool.

25 Claims, 2 Drawing Sheets

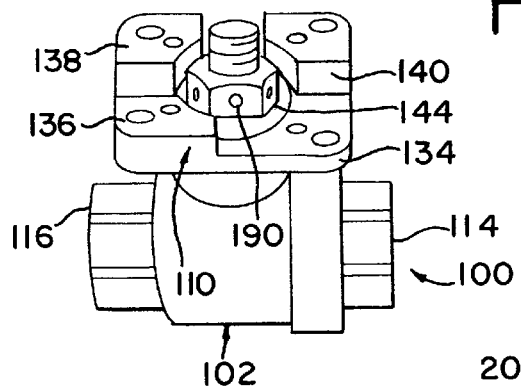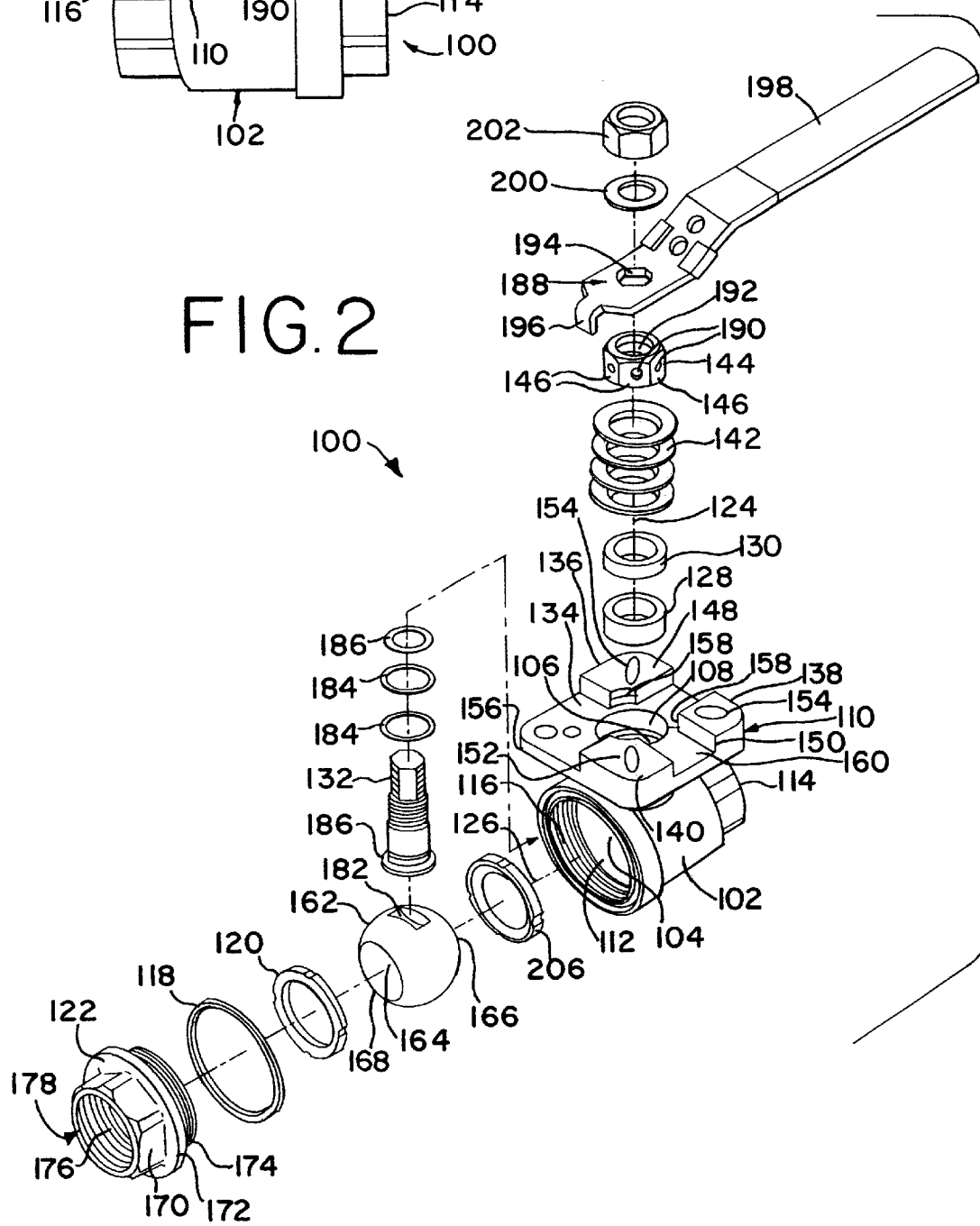

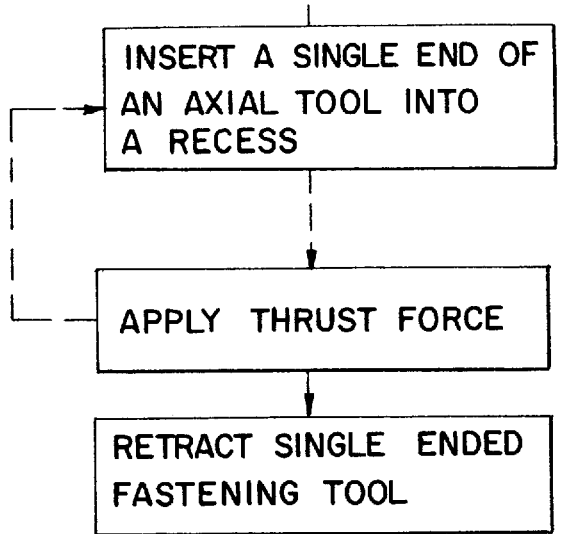
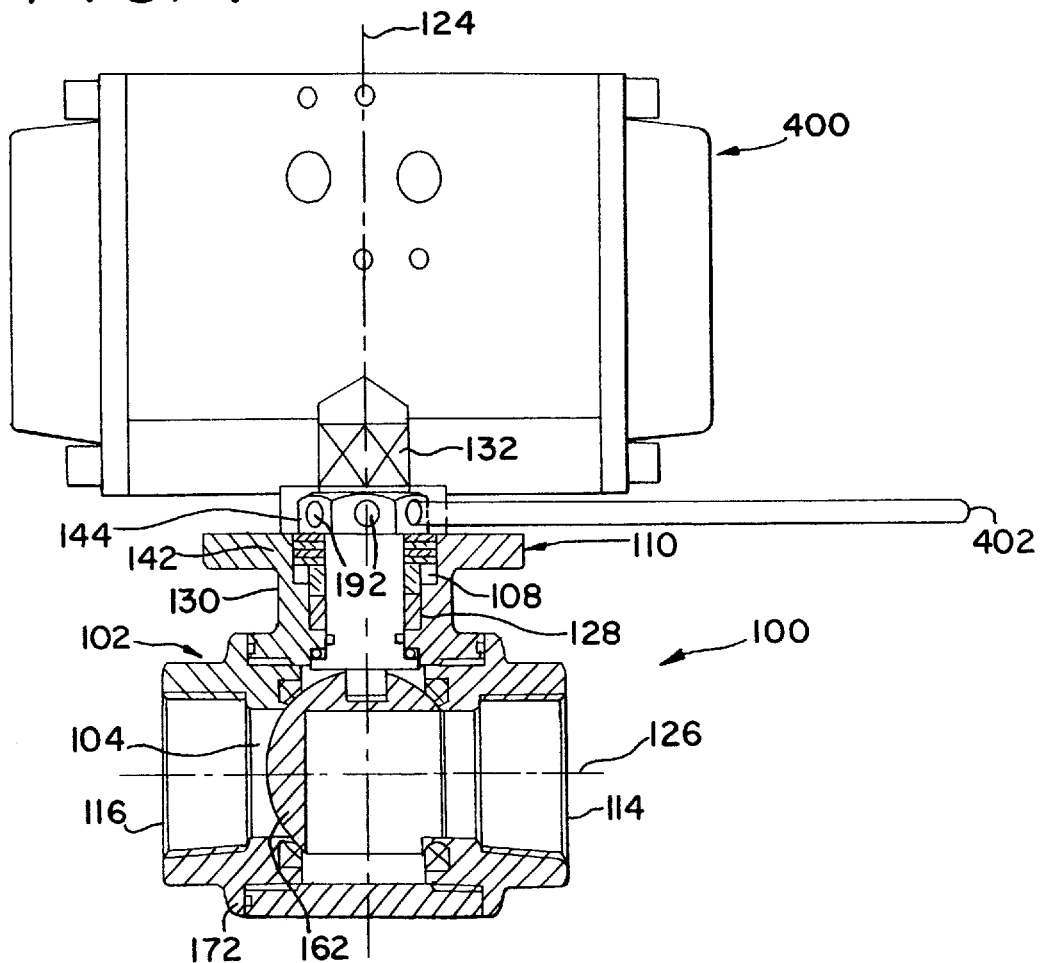

VALVE DEVICE WITH ELEVATED MOUNTING PADS

FIELD OF THE INVENTION

This invention relates to a device for controlling the flow of fluids; and more particularly, to a mechanical device that controls the flow of fluids through a movable element.

BACKGROUND

Ball-type valves are washerless devices that control the flow of fluids through piping, hoses, or other means. Flow is controlled through a ball-like element that has an opening perpendicular to a stem axis. By turning the stem the hole can be aligned with an inlet and an outlet permitting fluid to flow through a passageway. The stem may be further rotated through an angle that closes or partially obstructs the passageway that passes between the inlet and the outlet.

Ball-type valves can be very effective in controlling fluid flow. However, under some circumstances the valves may leak. A leak may occur when the seal between the ball-like element and the housing fails. In this case, fluid can pass around the seal and the housing and flow up the periphery of the stem. When the valve begins to leak, it can be necessary to disassemble the valve to access the retaining parts that press the ball snugly against the housing. Some valves, however, are not designed to be repaired or maintained, as the retaining parts are either concealed or inaccessible. The present invention is directed to an improved valve that provides access to the retaining parts.

BRIEF DESCRIPTION OF THE DRAWINGS

FIG. 1 is a perspective view of an embodiment of the invention.

FIG. 2 is an exploded view of FIG. 1.

FIG. 3 illustrates a flow diagram of FIG. 1.

FIG. 4 illustrates a cross-section view of FIG. 1 coupled to an actuator.

The dashed lines shown in FIG. 3 illustrate that other actions can occur before or after each illustrated step.

DETAILED DESCRIPTION OF THE PRESENTLY PREFERRED EMBODIMENTS

Embodiments of the apparatus and method of the present invention provide significant improvements to the access of a fastener that secures a moveable element to a housing. The apparatus and method utilize one or more mounting pads that provide access to the fastener and provide a substantially flat mounting surface that can be integrated or connected to actuators, and handles, for example. The apparatus and method further facilitate valve repair by eliminating parts such as brackets that can be needed to couple a valve to a peripheral device.

An embodiment of a valve 100 that incorporates an apparatus and a method of the invention includes a housing 102 having a chamber 104, annular recesses 106 and 108, and a mounting member 110. Preferably, the housing 102 is a unitary structure, although the chamber 104, annular recesses 106 and 108, and mounting member 110 may also be coupled together via intermediate structures. As shown between FIGS. 1 and 2, the chamber 104 includes a channel 112 through which fluid flows between an inlet 114 and an outlet 116. A fluid is a continuous amorphous substance that tends to move freely. In the illustrated embodiment, the chamber 104 is a cylindrical channel 112 that receives a moveable device secured by a seal 118, a seat 120, and a body end 122.

A first and a second annular recess 106 and 108 sharing a central axis 124 are positioned such that the central axis 124 is substantially perpendicular to a longitudinal axis 126 of the chamber 104. The first annular recess 106 is dimensioned to receive a stem seal 128 having a substantially torrid shape. The second annular recess 108 is dimensioned to receive a packing 130 and a plurality of washers 142 such as spring washers for example, that have substantially torrid shapes. Preferably, the second annular recess 108 is sized nominally greater than the outer diameter of the washers 142 and has a larger diameter than the first annular recess 106.

The mounting member 110 includes a generally rectangular platform 134 from which multiple mounting pads 136, 138, and 140 extend. As illustrated, the mounting pads 136, 138, and 140 have a polygonal shape and have curved contoured ends that extend from the substantially round corners that define the platform 134. Of course, the number of mounting pads can vary in alternative embodiments and can be positioned about many locations. The illustrated mounting pads 136, 138, and 140 preferably extend to a predetermined height above the platform 134 to facilitate access to exterior sides 146 of a fastener 144. Preferably, the heights of the mounting pads 136, 138, and 140 are nominally greater than the height of the fastener 144.

The mounting pads 136, 138, and 140 also include substantially flat distal surfaces 148, 150, and 152 that serve as mounting surfaces for a controller, an actuator, or any other peripheral device. Although the illustrated surfaces 148, 150, and 152 are substantially flat, contoured or curved surfaces are used in alternative embodiments. Either obround-like tracks 154 (illustrated in FIG. 2) or multiple mounting holes (illustrated in FIG. 1) extend between the distal surfaces 148, 150, and 152 of the mounting pads 136, 138, and 140 and the proximal surface 156 of the platform 134. The mounting holes and obround-like tracks 154 are dimensioned to receive locking devices that can secure the mounting pads 136, 138, and 140 to a peripheral surface.

As shown in FIG. 2, the mounting pads 136, 138, and 140 may include multiple tiers. Preferably a first tier 158 extends to an intermediate height between the platform 134 and a second tier. The second tier, which is formed by the distal surfaces 148, 150, and 152 preferably, extends to a height that provides separation between a peripheral surface and the platform 134.

Referring again to FIG. 2, a perspective view of a movable member is shown. The movable member in this embodiment is a ball-type member 162 although other spherical, conical, and substantially round elements are used in alternative embodiments. The ball-type member 162 controls the flow of fluid between the inlet 114 and the outlet 116. As shown, the ball-type member 162 has a cylindrical channel 164 flowing between a first and a second opening 166 and 168. It is the rotation of the ball-type member 162 in the chamber 104 that shuts, partially obstructs, or opens the chamber 104 to fluid flow.

As shown in FIG. 2, the seat 120 is positioned between the seal 118 and the ball-type member 162. The body end 122 biases the seal 118 against the seat 120. The seat 120 bears against the ball-type member 162 to form a fluid tight seal. The body end 122 includes a hexagonal block 170 terminating at an annular flange 172. A mating member 174 having a thread extends outwardly from the annular flange 172. In this embodiment, a threaded opening 176 extends through the hexagonal block 170, annular flange 172, and mating member 174 to accommodate fluid flow through the housing 102. The threaded opening 176 also provides means to connect an unsecured end 178 of the body end 122 to peripheral devices. Preferably, the inner diameter of the body end 122 is substantially equal to the inner diameter of the cylindrical channel 164.

From the forgoing description, it should be apparent that the inlet 114 can be formed from a seal, a seat, and an end fastener. However, in this embodiment the inlet 114 and housing 102 are a unitary structure. Only a seat 206 separates the ball-type member 162 from an internal annular flange in proximity to the inlet 114.

The ball-type member 166 is preferably secured to a handle 188 by the stem 132. The lower portion of the stem 132 extends through the first annular recess 106 into an interior slot 182 of the ball-type member 162. A pair of thrust bearings 184 and an O-ring 186 are disposed around the stem 132 between an annular flange 186 and an interior wall of the chamber 104. The annular flange 186 preferably has a biasing surface in contact with the ball-type member 162. The thrust bearings 184 serve to minimize contact and thus friction between the ball-type member 162 and the interior wall of the chamber 104. The O-ring 186 having a substantially torrid shape is used as a gasket to seal the chamber 104 from the first annular recess 106.

The stem seal 128 is disposed around a non-threaded portion of the stem 132 within the first annular recess 106. The stem seal 128 prevents fluid flow from the chamber 104 to the annular recesses 106 and 108 and further provides annular support to the stem 132. The packing 130 is coupled to the stem seal 128 within the first annular recess 106. The packing 130 counteracts the transverse forces that effect stem 132 rotation and also separates the washers 142 from the stem seal 128. The washers 142 distribute the rotational forces generated by a handle 188 and the axial forces generated by the fastener 144.

The fastener 144 preferably has a hexagonal shape. A substantially round hole 192 near a center is enclosed by a thread that engages the thread of the stem 132. The fastener 144 also includes cylindrical shaped recesses 190 positioned on exterior sides 146. The recesses 190 are preferably dimensioned to receive a round end of an axial tool 402 (shown in FIG. 4). The recesses 190 can take many forms and have many dimensions. For example, the recesses 190 can be keyed (i.e., an allen key), have a hexagonal shape, have a star shape, or have an out-of-round shape, for example. The recesses 190 provide means to receive a fastening tool such as the axial tool 402 or an allen-type wrench, for example. In this embodiment, a small thrust force applied to an open end of the axial tool 402 can create a large turning moment that can tighten the fastener 144 to the stem 132 without disassembling or loosening other parts of the valve 100.

A movable handle 188 is secured to a projecting end of the stem 132 above the fastener 144. A hole 194 having an out-of-round shape is positioned near an end portion of the handle 188 to receive the out-of-round shape of the stem 132. The end portion of the handle 188 has a projection 196 depending from a lower edge of the handle 188. The projection 196, which is substantially parallel to one exterior surface of the fastener 144, is adapted to engage one or more angled corners of the fastener 144 so that the handle 188 and the stem 132 can be rotated by pulling the projecting end of the handle that underlies a sleeve 198. A washer 200 in combination with a nut 202 secures the stem 132 to the handle 188 near a side accessible channel 160 formed by the platform 134 and the mounting pads 136, 138, and 140.

The degree of access to the fastener 144 in this embodiment depends on a number of factors including the number of recesses 190 and exterior sides 146, the heights of the mounting pads 136, 138, and 140, and the degree of separation between the peripheral device and the platform 134, for example. In this embodiment, adjacent sides of at least two mounting pads 136 and 140 are separated by approximately ninety degrees as measured by aligning the cross lines of a protractor to the intersecting central axis 124 and the longitudinal axis 126. The large space that separates these mounting pads 136 and 140 facilitate access to the fastener 144, the stem seal 128, the packing 130, and the washers 142.

FIG. 3 illustrates a flow diagram that describes the repair or assembly of a valve apparatus 100. At a step 302 a round end of an axial tool 402 is inserted into a recess 190. Preferably, the recess 190 is an allen-type recess. At a step 304, a small thrust force is applied to the open end of the axial tool 402 until the axial tool 402 engages a side surface of a mounting pad. The thrust force generated by the axial tool 402 creates a turning moment that tightens or loosens the fastener 144. Steps 302 and 304 are repeated as necessary to reach a desired tightening pressure between the fastener 144 and the washers 142. At a step 306, the axial tool 402 is retracted from the fastener 144 through the side accessible channel 160.

Although the above described apparatus and method has been described in reference to a manual application, the apparatus and method can be readily adapted to a controller, an actuator, or any other pneumatic, electrical, or fluid controlled regulating device. For example, FIG. 4 illustrates an embodiment in which the stem 132 is coupled to an actuator 400. The substantially squared shape threads and rounded corners of the stem 132 (best shown in FIG. 2) are coupled to a mating recess within the actuator 400.

From the forgoing description, it should be apparent that the apparatus 100 is not limited by temperature as the above-described components may be manufactured from a variety of high and low temperature resistant materials including metals and polymers, for example. The fastener 144 can receive one or multiple washers 142 that keep the fastener 144 in engagement with the housing 102 and distribute axial and radial stress across a large area. It should also be apparent that the apparatus and method are not limited to a particular controller or actuator and that the angle of separation between any two mounting pads can vary from approximately five degrees to approximately one hundred and eighty degrees.

The apparatus and method described above provides a number of advantages over other valve devices. By integrating elevated mounting pads to a mechanical valve, a single end of a tool can engage a fastener without engaging other parts. Control of the apparatus and method can occur by manual or automated means. The apparatus and method further facilitate valve repair by eliminating parts such as brackets that can be needed to couple a valve to a peripheral device.

The foregoing detailed description describes only a few of the many forms that the present invention can take and should therefore be taken as illustrative rather than limiting. It is only the following claims, including all equivalents that are intended to define the scope of the invention.

What is claimed is:

1. A valve for controlling the flow of fluids comprising:
   a chamber having an inlet, an outlet, and an annular recess;
   a movable element disposed in said chamber to control the flow of fluids between said inlet and said outlet;
   a stem secured to said movable element said stern extending through said annular recess to an exterior of said chamber;
   a seal disposed around said stem and positioned within said annular recess;

a fastener in displaceable engagement with said stem and having recesses formed in each exterior side surface of said fastener; and a plurality of mounting pads, said plurality of mounting pads consisting of three or less mounting pads positioned about said annular recess, said mounting pads having elevated mounting surfaces adapted to provide separation between said fastener recesses and a peripheral surface.

2. The valve of claim 1 further comprising a platform surrounding said recess wherein said plurality of mounting pads extend from corners of said platform.

3. The valve of claim 2 wherein said platform, said mounting pads, and said chamber are a unitary structure.

4. The valve of claim 1 wherein said mounting pads have a polygonal shape and contoured ends.

5. The valve of claim 4 wherein said movable member is a ball-type member.

6. The valve of claim 5 further comprising a platform having substantially round corners surrounding said annular recess wherein said mounting pads extend from more than one substantially round corner.

7. The valve of claim 1 wherein said mounting surfaces are substantially flat.

8. The valve of claim 1 wherein said mounting pads further include obround-like tracks passing through said mounting surface.

9. The valve of claim 1 wherein said recess is an allen-type recess.

10. The valve of claim 1 wherein at least two of said mounting pads are separated by at least ninety degrees.

11. The valve of claim 10 wherein adjacent sides of said at least two of said mounting pads are separated by at least ninety degrees.

12. The valve of claim 1 wherein said fastener recesses have a substantially round shape.

13. The valve of claim 12 wherein said fastener recesses are allen-type recesses.

14. The valve of claim 13 wherein said mounting pads comprise a plurality of tiers.

15. The valve of claim 1 wherein said plurality of mounting pads consists of one mounting pad.

16. A valve for controlling the flow of fluids comprising:
    a chamber having an inlet, an outlet, and an annular recess;
    a platform surrounding said annular recess coupled to said chamber and surrounding said recess;
    a movable element disposed in said chamber to control the flow of fluids between said inlet and said outlet;
    a stem secured to said movable element said stem extending through said annular recess to an exterior of said chamber;
    a seal disposed around said stem and positioned within said annular recess;
    a fastener in displaceable engagement with said stem and having recesses formed within exterior surfaces; and
    a plurality of mounting pads, said plurality of mounting pads consisting of three or less mounting pads positioned about said annular recess, said mounting pads having mounting surfaces adapted to provide separation between said fastener recesses and a peripheral surface.

17. The valve of claim of claim 16 further comprising a handle secured to said stem.

18. The valve of claim 16 wherein said plurality of mounting pads consists of one mounting pad.

19. A method of constructing a ball-type valve comprising:
    forming a unitary housing having a chamber, a platform, and elevated mounting pads that extend outwardly from said housing away from said platform; said elevated mounting pads consisting of three or less mounting pads;
    positioning a ball-type element in said chamber;
    coupling a stem to said ball-type element so that a portion of said stem extends through an annular recess formed in said housing;
    positioning a fastener on said stern; said fastener having a substantially round recess in each exterior side surface of said fastener; and
    tightening said fastener around said stem by engaging some of said substantially round recesses with a round end of an axial tool through a side accessible channel.

20. The method of claim 19 wherein said method further comprises forming obround-like tracks through mounting surfaces of said elevated mounting pads.

21. The method claim 19 wherein said method further comprises attaching an actuator to said elevated mounting pads such that said actuator is separated from said platform by said side accessible channel.

22. The method of claim 19 wherein said mounting pads have a polygonal shape and contoured ends.

23. The method of claim 19 wherein said substantially round recesses comprise allen-type recesses.

24. A valve for controlling the flow of fluids comprising:
    a chamber having an inlet, an outlet, and an annular recess;
    a movable element disposed in said chamber to control the flow of fluids between said inlet and said outlet;
    a stem secured to said movable element, said stem extending through said annular recess to an exterior of said chamber;
    a seal disposed around said stem and positioned within said annular recess;
    a fastener in displaceable engagement with said stem and having recesses formed in each exterior side surface of said fastener; and
    a plurality of mounting pads, said plurality of mounting pads consisting of three or less mounting pads positioned about said annular recess, said plurality of mounting pads having elevated mounting surfaces adapted to provide separation between said fastener recesses and a peripheral surface; and
    each of said plurality of mounting pads having at least one obround recess.

25. A valve for controlling the flow of fluids comprising:
    a chamber having an inlet, an outlet, and an annular recess;
    a movable element disposed in said chamber to control the flow of fluids between said inlet and said outlet;
    a stem secured to said movable element, said stem extending through said annular recess to an exterior of said chamber;
    a seal disposed around said stem and positioned within said annular recess;
    a hexagonal fastener in displaceable engagement with said stem and having recesses formed in each exterior side surface of said fastener; and
    a plurality of mounting pads, said plurality of mounting pads consisting of three or less mounting pads positioned about said annular recess, said plurality of mounting pads having elevated mounting surfaces adapted to provide separation between said fastener recesses and a peripheral surface; and
    each of said mounting pads have an obround recess and are adapted to couple an actuator.

* * * * *

UNITED STATES PATENT AND TRADEMARK OFFICE
CERTIFICATE OF CORRECTION

PATENT NO.      : 6,446,935 B1
DATED           : September 10, 2002
INVENTOR(S)     : Alexander Winkler It is certified that error appears in the above-identified patent and that said Letters Patent is hereby corrected as shown below:

<u>Column 4,</u>
Line 6, delete "stern" and substitute -- stem -- in its place.

<u>Column 6,</u>
Line 12, delete "stern" and substitute -- stem -- in its place.

Signed and Sealed this

Twenty-fourth Day of June, 2003

JAMES E. ROGAN
*Director of the United States Patent and Trademark Office*